Oct. 8, 1929.  H. ROSENTHAL  1,730,786
MEANS AND METHOD OF POWER TRANSMISSION
Filed Sept. 5, 1924   3 Sheets-Sheet 1

INVENTOR
Henry Rosenthal
BY Gifford & Scull
his ATTORNEYS.

Oct. 8, 1929.                H. ROSENTHAL                1,730,786
              MEANS AND METHOD OF POWER TRANSMISSION
                   Filed Sept. 5, 1924       3 Sheets-Sheet 3

INVENTOR
Henry Rosenthal
BY Gifford + Scull
his ATTORNEYS.

Patented Oct. 8, 1929

1,730,786

UNITED STATES PATENT OFFICE

HENRY ROSENTHAL, OF NEW YORK, N. Y.

MEANS AND METHOD OF POWER TRANSMISSION

Application filed September 5, 1924. Serial No. 736,045.

My invention relates to means and methods of power transmission and more particularly to an improvement in means and method of transmitting the power from the prime mover to the driving wheels in automotive equipment. However, I do not limit my invention to this use and neither do I limit it to any particular type of engine, as any prime mover may be used.

It is well known that with the mechanical transmission now commonly in use in engine driven automotive equipment, the engine is at nearly all times operating under partial load with an efficiency of approximately fifty per cent (50%) of that obtainable when the engine is operating at or near full load.

It is possible with methods now in use to operate engines at or near full load, only when the load is of a constant nature. If the load is not of a constant nature, continuous full load operation becomes impossible, as even a temporary substantial increase in load is beyond the range of the engine, and it often ceases to operate. What I mean herein by "full load" is the maximum steady output of the engine at any given speed. It may be the case that "full load", as described above, is a higher load than that at which the engine will deliver energy with the greatest economy. If this were the case, it may be desirable to interpose in the system a throttle which at a fixed position would limit the maximum steady output of the engine at any given speed to that at which the engine operates at approximately maximum economy. Under this condition the "economic load" would become the "full load", as described above, and as used in this invention. My system may be operated all the time at "full load" of the engine or at the "economic load" or part of the time at "full load" and part of the time at the "economic load" or vice versa.

By means of my invention, the prime mover can be operated at or near full load and will automatically adjust itself to variations in applied load. My invention consists in means and method of automatically regulating the speed of the prime mover by means of the torque and the horse power of the applied load so as to maintain substantially full load on the prime mover.

My invention is shown in the accompanying drawings in several modifications, but I do not limit my invention to the form shown. My invention will better be understood by reading the following specification taken with the attached drawings forming a part thereof, and in which Fig. 1 shows schematically the essentials of one embodiment of my invention;

Figure 1:
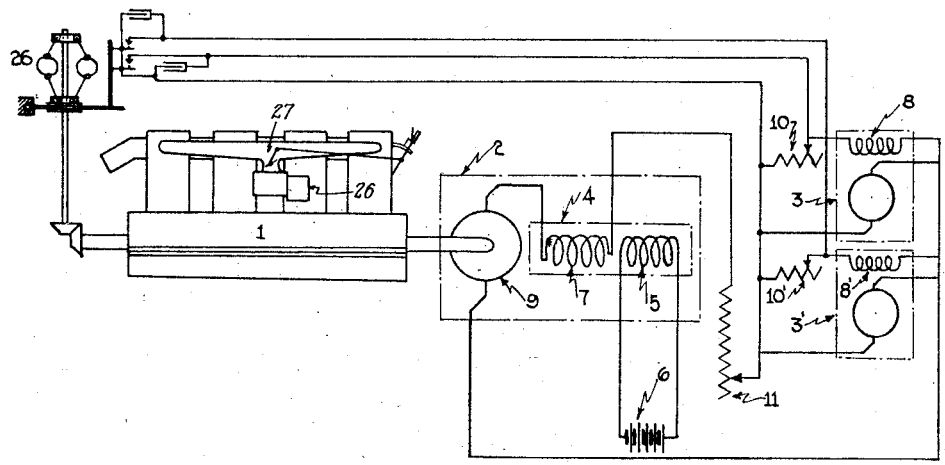

In Fig. 1 the prime mover 1 is directly connected to an electric generator 2. Electric motors 3 and 3' are mechanically connected to the driving apparatus by any suitable means.

The generator 2 is for direct current, with a differential compound field 4. A portion 5 of the field 4 is directly excited by means of some source of constant electromotive force, such as the battery 6. The other portion 7 of this field is excited by means of the current flowing through the generator armature 9, and is so wound as to oppose the field of the portion 5. The torque of a given direct current dynamo is proportional to the product of the value of field flux and armature current, and with this form of my invention the fields and the armature should be so proportioned that an increase in armature current will result in a decrease in the value of the product of the armature current and the field flux, which would result in a decrease in the generator torque, which decrease in generator torque would result in an increase in engine speed, as will be shown later.

With the form of field which I have described, an increase in armature current would result in a decrease in field flux and if the fields were totally unsaturated this decrease in field flux would be proportional to the current flowing in the armature. With this condition the maximum value of torque would occur at a value of armature current equal to one-half of the value of armature current at which the field flux became zero in value. It is between these two values that I propose to operate.

With a prime mover equipped with a constant speed governor, the above condition of field would result in unstable operation, but with an ungoverned engine as I propose, the dynamo will govern the engine, and the engine will in turn react to keep the dynamo stable, within the range of operation.

The motors 3 and 3' are indicated as direct current shunt motors, with shunt fields 8 and 8', respectively, these fields being controlled by adjustable resistance 10 and 10'. The adjustable resistance 11 may be placed in series with these motors for starting purposes. The fields of the motors should be so designed that they do not become saturated within the average operating range, so that an increase in applied voltage will give an almost proportional increase in field flux. The motors will thus operate at approximately constant speed with varying applied E. M. F.'s.

Figure 2:
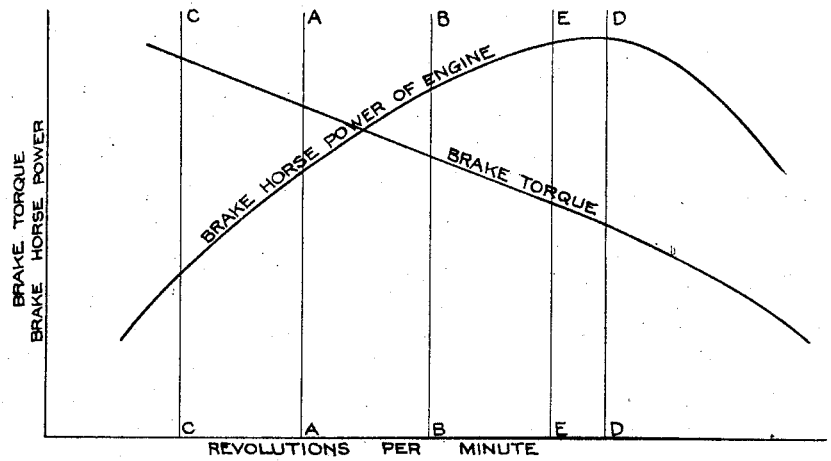
Fig. 2 shows typical characteristic brake horse power and torque curves of an internal combustion engine.

Fig. 2 shows typical characteristic brake horse power and torque curves of a prime mover. With this form of my invention it is preferable that, throughout the operating range of the prime mover, the torque continually decrease and the horse power continually increase, as the prime mover increases, in speed. The way in which my invention operates may be illustrated as follows: Suppose that the load is such that the prime mover is operating at the speed indicated by the vertical line AA, Fig. 2. An increase in the applied load on the motors would require additional current. This additional current would cause a decrease in the generator torque, which in turn, due to the characteristic of the prime mover, would allow the prime mover to increase in speed, until some speed is reached, such as indicated by the vertical line BB, where the torque and horse power of the prime mover would balance the torque and horse power required for the newly applied load. If the applied load instead of increasing from AA had decreased a certain amount, the current of the motors would have decreased, the torque of the generator would have increased, and the prime mover would have slowed down until some speed was reached, such as indicated by the vertical line CC, where the torque and horse power of the prime mover balanced the torque and horse power of the decreased load.

It will be noted that for any torque there is a corresponding speed, and for any speed there is a corresponding torque, while operating on any particular torque line; and the dynamo should be so adjusted that its maximum torque will come near the minimum speed at which the prime mover will operate and the maximum torque should be in amount equal to the torque of the prime mover corresponding to the minimum speed and to the torque line on which it is desired to operate. This can be easily accomplished by variation in the characteristics of the generator field, either by changing the current through the separately excited portion 5 by means of a variable resistance as shown at 12, in Figures 3 to 5, inclusive, or by placing a variable shunt around the series portion of field 7, or by both means combined.

By properly designing the motors 3 and 3' and the resistance 10 and 10', any speed within operating limits can be obtained on these driving motors with a corresponding range of speeds of the apparatus being driven. Series, parallel, and series-parallel arrangement may be used on the motors where a wide range of speeds and loads is required. This arrangement will be described more fully.

It will be noted on Fig. 2 that on the portions of the curves to the right of the vertical line DD, both the torque and the horse power decrease with an increase of speed. Operation over this portion of the curve is unstable and means may be provided to prevent the prime mover from reaching the speed corresponding to this point. This may be accomplished by various means, such as a centrifugal governor 26 (Fig. 1) which would control resistances 10 and 10' so as to decrease the resistance, thus increasing the motor field and decreasing the motor speed, when the speed of the prime mover reaches some point as indicated by the vertical line EE, Fig. 2. Or a relay operated by means of the voltage of the generator 2 may be provided, if such relay were arranged to decrease the resistances 10 and 10' whenever the voltage of the generator reached a certain limiting value. The generator while operating will deliver an increasing voltage corresponding with increasing speed of the prime mover.

Various modifications may be made to this means of applying my invention, some of which are described as follows:

It may in some cases be desirable, or even necessary to use two or more prime movers instead of a single prime mover, as shown in Fig. 1. This condition will arise when the character of the load makes it desirable to use more than one prime mover, or when the horse power required is of such magnitude as to require several small engines, rather than one large one.

Figure 3:
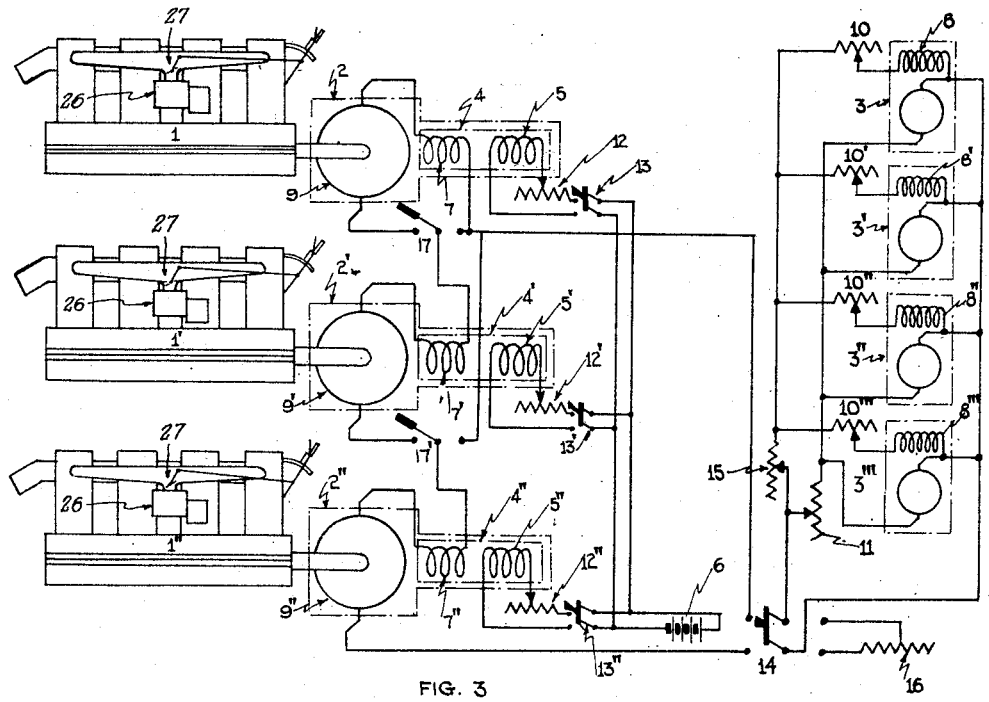
Figs. 3 and 4 show schematically means for utilizing a plurality of prime movers.
Figure 4:
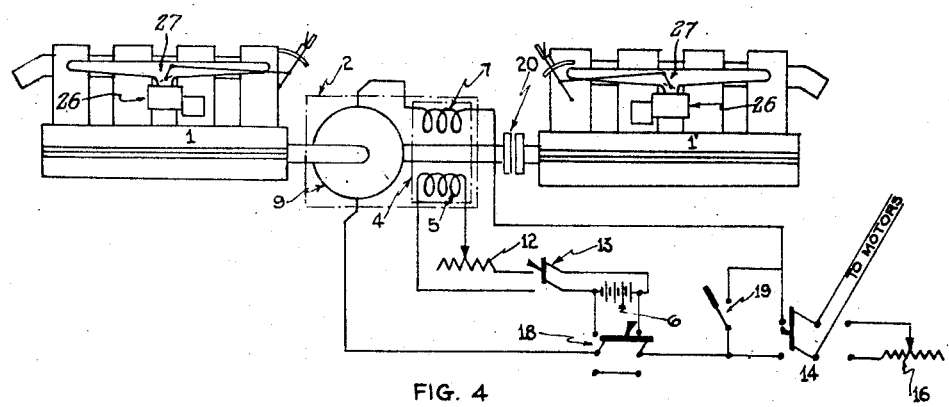

Figs. 3 and 4 shows schematically means for utilizing several prime movers in connection with my invention. Fig. 3 shows a generator for each prime mover, while Fig.

4 shows two prime movers connected to one generator. When desirable, a combination of these two schemes may be made. In these figures the corresponding parts are numbered with the same numerals as in Fig. 1.

In Fig. 3, 17 and 17' are switches controlling the main circuit from the generators, and 13, 13' and 13" are switches controlling the shunt field circuits of the generators. In this figure, prime mover 1" is used alone for carrying the lightest load, prime mover 1" and 1' are used for carrying medium loads and prime movers 1, 1' and 1" are used for carrying the heaviest loads.

When prime mover 1" is used alone, switches 17 and 17' are closed to the right to open circuit the armature circuits of generators 2 and 2' and switch 13" is closed to close the shunt field circuit of generator 2". When prime movers 1" and 1' are being used, switch 17' is closed to the left to connect the armature circuit of generator 2' in series with that of generator 2". 17 remains closed to the right, and switches 13" and 13' are closed to close the shunt field circuits of generators 2" and 2', respectively. When prime movers 1", 1' and 1 are being used, switches 17 and 17' are closed to the left to connect all the generator armatures in series and switches 13, 13' and 13" are closed to connect the shunt fields of all the generators.

The operation of these switches together with the operation of any devices for the starting and stopping of the prime movers may be controlled by the speed of the operating prime mover, the voltage of the generators, or other similar means in a well-known manner.

While three sets of prime movers and generators are shown in the scheme, any number may be used in a similar manner. Also the scheme shows a definite sequence in the operation of the prime movers. By a slight change in the wiring connections of the generators, the sequence of operation of the prime movers may be selected by the operator.

Figure 5:
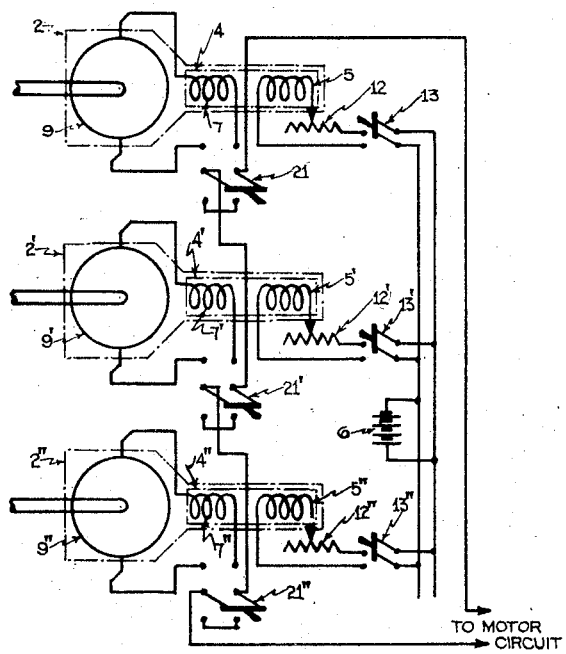
Fig. 5 shows an arrangement whereby a plurality of prime movers may be used, their sequence of operation being under the control of the operator.

Fig. 5 shows one switching arrangement in which the sequence of operation of the prime mover may be selected by the operator. This figure shows the generators and generator wiring only, as the motor wiring may be the same as that shown in the other figures. Switches 21, 21' and 21" control the main circuits of the generators 2, 2' and 2", respectively. With any switch in the upper position, the generator which it controls is connected to the motor circuit. With the switch in the lower position, the generator is disconnected.

In Fig. 4, the prime movers 1 and 1' are connected to a single generator 2. Only the prime movers, the generator and the generator wiring are shown in this figure, as the motor wiring may be similar to that of the other figures. A single shaft clutch 20 may be used to connect the prime mover 1' when it is required. An additional shaft clutch may be used between the prime mover 1 and the generator 2, in case the sequence of operation of the prime movers should be under the control of the operator. This clutch is not shown.

Figs. 3 and 4 show a switch 14 and a resistance 16, which may be used for braking when it is desired to stop the driven apparatus. Braking for slowing down may be accomplished by reducing adjustable resistances 10, 10', 10", etc., thereby increasing motor fields 8, 8', 8", etc., until the minimum running speed of the motor is reached. For further reducing the speed of the apparatus and for bringing it to a stop, switch 14 is thrown to short circuit the motors through the adjustable resistance 16. The adjustable starting resistance 11 also may be used as a short circuiting resistance, if desired, or the short circuiting resistance may be combined with the starting resistance, and the resistance 16 eliminated. If the generators are connected as in Fig. 5, switch 14 may be eliminated and the motors used for braking by closing switches 21, 21' and 21" in the downward position.

In Figs. 1, 3, 4 and 5, a battery is shown as the source of constant potential for the shunt fields 5, 5', etc., of the generators 2, 2', etc. This battery may be a storage battery and it can be charged by means of the generator (or generators) by connecting the battery in series with the main line and the motors, as shown in Fig. 4. Switch 18 serves to disconnect the battery when charged and to connect it when it needs recharging. This switch may be automatically controlled by means of the battery voltage or other suitable means.

When internal combustion engines are used as prime movers, the generators 2, 2', etc., may be used as motors for starting the prime movers, using the battery 6 as the source of power. On closing switches 19 and 13, and 18 to upper position, Fig. 4, the generator 2 will act as a motor to crank the engine. Switch 19 may be opened automatically when the engine starts to deliver power. A throttle or similar governing means may be employed to control the engine during the period of "warming up" and during the time the engine is "idling".

In the Figs. 1, 3, 4 and 5, to obtain maximum starting torque on the motors, it is necessary to use minimum motor field resistance, with maximum motor field current, and consequently minimum running speed. To accelerate above this speed it is necessary to cut in field resistance manually or otherwise.

Figure 6:
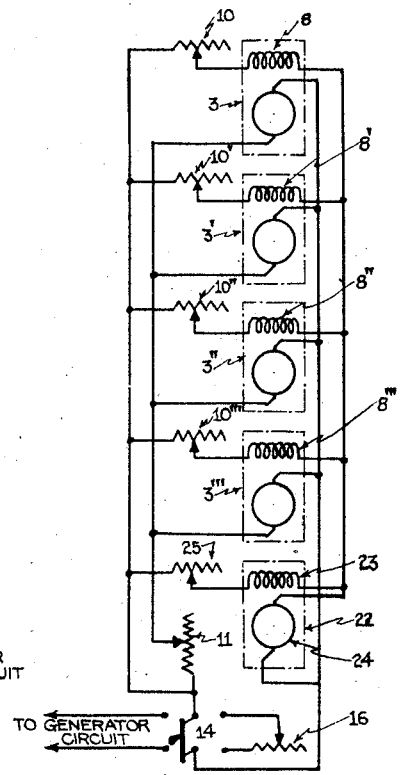
Fig. 6 shows an arrangement for connecting the motor fields so as to obtain greater acceleration.

Fig. 6 shows a method of connecting the motor fields so that the motors will have maximum starting torque and will still accelerate to the desired running speed. This is a well-known system of motor control in which the motors, resistances and switches are numbered the same as in the previous figures, and 22 is a regulating dynamo, driven at a fixed ratio to the motor speed. 23 and 25 are the field and field resistance of the regulating dynamo, which are connected across the fields of the main motors. In this scheme, resistances 10, 10', 10", etc., serve simply to equalize the motor speeds and control is effected by changing adjustable resistance 25. The main motors will have full field on starting, but will have reduced fields as they accelerate and they will accelerate to a speed depending upon the value of adjustable resistance 25.

Fuel from the fuel tank may be metered to the engine by any suitable means such as a carburetor 26 and at the same time mixed with the proper amount of air if an Otto or similar cycle is used in the prime mover. A butterfly throttle valve 27 controls the flow of fuel air mixture to the engine in the well-known manner. Any other means for controlling the power output of the engine is to be regarded as the equivalent of a throttle controller.

Where the range of speed and torque required for the load is in excess of the range of speed and torque of a single motor, series, series-parallel, and parallel arrangements of the motors may be made. Standard switching arrangements for the connections may be used either with resistance in series with the motor armatures when connections are changed, or without series resistance if the motor fields are properly controlled. The use of series, series-parallel and parallel connections will tend to limit sparking at the motor brushes, as the ratio of armature current to field current will be more nearly constant than if series (or parallel) connection were used alone.

To further prevent sparking, commutating fields may be used on the generator (or generators) and the motor (or motors).

Many changes may be made in the details without departing from the spirit of my invention.

I claim:

1. In an internal combustion engine drive system, the combination of an internal combustion engine, an electric generator driven by the engine and having opposing separately excited and series fields and subjected to variable load conditions, a motor driven by the generator, the field of the generator being so designed and proportioned relative to the generator armature that upon variations in the load conditions of the generator the speed of the engine is varied to that amount at which the varied load becomes substantially the full load of the engine at that speed.

2. The combination of a prime mover, a driving member and an intermediate member functionally connecting the prime mover and the driving member together, means on the intermediate member responsive to changes in load of the driving member, and means connecting the prime mover and the intermediate member together whereby the changes in load of the driving member are transmitted to the prime mover and the speed of the prime mover so adjusted thereby that the changed load becomes substantially the full load of the prime mover at that speed.

3. In an engine drive system, the combination of an internal combustion engine having the characteristics of increasing brake horsepower and decreasing brake torque upon increase of speed, a motor subjected to varying conditions of load, a generator electrically connected with the motor and mechanically connected to the engine, opposing fields on the generator, one of said fields being separately and substantially constantly excited, a field on said generator connected in series with the generator armature and the motor armature, said generator fields being so proportioned that as the motor load increases the generator torque decreases thus causing the engine speed to increase to a substantially predetermined value.

4. In an engine drive system, the combination of an internal combustion engine having the characteristics of increasing brake horsepower and decreasing brake torque upon increase in speed, a driving member subjected to varying load conditions, means connecting the engine and the driving member together and being responsive to the varying load conditions of the driving member, said means acting also to adjust the speed of the engine to that amount at which the full load of the engine at that speed corresponds to the instant load of the driving member.

5. In an internal combustion engine drive system, the combination of an internal combustion engine controlling means therefor, a generator driven thereby, a motor driven by the generator and subject to variable load, a differential field for the generator, one element of which is in series with the generator armature and the motor, and connections between the motor, generator and engine whereby the engine speed is automatically increased with increase of load to a substantially predetermined value at any given setting of the controlling means.

6. In a power transmission system, the combination of a generator, a plurality of prime movers for driving said generator, a motor driven by the generator and subject to variable load, a differential field for said generator, one component of said field being excited from a substantially constant source and the excitation of the other being proportional to the motor current and thereby a function of the load whereby the torque on the generator and the speed of the prime movers vary inversely to maintain substantially full load on the prime movers.

7. In a drive system, the combination of an internal combustion engine, a generator driven thereby, a motor driven by the generator, a compound field for said generator, one component of which field is separately excited, and another component of which field is a function of the motor and generator armature current, said field components being arranged to oppose each other and adapted to affect the brake torque of the generator upon increase of load so that the engine speed automatically increases to that value at which full load is maintained on said engine.

8. In an engine drive system, the combination of an engine having the characteristics of increasing brake horsepower and decreasing brake torque upon increase in speed controlling means for the engine, a driving member subjected to varying load conditions, means connecting the engine and the driving member together and being responsive to the varying load condition of the driving member, said means acting also to adjust the speed of the engine to that amount at which the load of the engine at that speed and at any given setting of the controlling means for the engine, corresponds to the load of the driving member.

9. In a drive system, the combination of an engine, a generator driven thereby and a motor driven by the generator, a compound field for said geneartor, one component of which field is separately excited, and another component of which field is a function of the motor and generator armature current, said field components being arranged to oppose each other and being so proportioned that an increase in armature current will cause a decrease in generator torque.

10. The combination of a prime mover controlling means therefor, a driving member and an intermediate member functionally connecting the prime mover and the driving member together, means on the intermediate member responsive to changes in load of the driving member and means connecting the prime mover and the intermediate member together whereby under changes in load the driving member maintains substantially constant speed and the speed of the prime mover is adjusted to that amount at which the load of the prime mover at any given setting of the controlling means corresponds to the load of the driving member.

11. The combination of a prime mover controlling means, a driving member and an intermediate member functionally connecting the prime mover and the driving member together, means on the intermediate member responsive to changes in load of the driving member and means connecting the prime mover and the intermediate member together whereby under changes in load the speed of the prime mover is adjusted to that amount at which the load of the prime mover at any given setting of the controlling means corresponds to the load of the driving member.

12. The combination of a prime mover having a falling speed: torque characteristic, a driving member, and an intermediate member, the latter being an electric generator having an armature, with a fixed number of conductors carrying electric current, a magnetic field which the armature conductors cut, said field being constructed and connected so that as the current in the armature increases, the product obtained by multiplying the value of the armature current and the value of the effective flux of the magnetic field decreases, thus causing a decrease in generator torque with increase in generator current thereby causing an increase in the speed and load of the prime mover as the generator current increases.

13. The combination of a prime mover having a falling speed torque characteristic, a driving member, and an intermediate member, the latter being an electric generator having an armature carrying electric current, a magnetic field which the armature conductors cut, said field and armature being so constructed that as the current in the armature increases, the product obtained by multiplying the number of conductors carrying current on the armature by the value of current which they carry and by the value of the effective flux of the magnetic field decreases, thus causing a decrease in generator torque with increase in generator current thereby causing an increase in the speed and load of the prime mover as the generator current increases.

14. The combination of a prime mover having a falling speed torque characteristic, a driving member, and an intermediate member, the latter being an electric generator having an armature carrying electric current and a magnetic field cut by the armature conductors, said field and armature being so proportioned that as the power load of the generator increases the torque of the generator decreases, thus causing a decrease in generator torque with increase in generator current thereby causing an increase in the speed and load of the prime mover as the generator current increases.

15. In an engine drive system, the combination of an engine having the characteristics of increasing brake horsepower and decreasing brake torque upon increase in speed, a motor subjected to varying conditions of load, a generator electrically connected with the motor and mechanically connected to the engine, opposing fields on the generator, one of said fields being separately and substantially constantly excited, a field on said generator connected in series with the generator armature and the motor armature, said generator fields being so proportioned that as the motor torque increases the generator torque decreases thus causing the engine speed to increase to a substantially predetermined value.

16. The combination of an engine, a motor subjected to a variable load, and a generator between the engine and motor, in which combination the relation of the engine and generator is adjusted by providing the generator with a bucking field winding of such dimensions relative to those of the separately excited winding that the engine speed will so vary when the load is varied, that the engine will so respond as to assume substantially all of the varied load over a considerable range of engine speed.

17. The combination of a prime mover, a motor subjected to a variable load, and an electric generator functionally connecting the prime mover and the motor together, means connecting the prime mover and electric generator together and means on the electric generator responsive to changes in load of the motor member, whereby changes in load on the motor are transmitted to the prime mover and whereby the speed of the prime mover will so vary when the load is varied, that the prime mover will so respond as to assume substantially all of the varied load over a considerable range of engine speed.

18. The combination of an engine, a motor subjected to a variable load, a generator between said engine and motor, a bucking field winding on said generator, and a separately excited winding on said generator, the value of the bucking field winding and the value of the separately excited field winding of said generator to be so proportioned relative to each other that when the motor load is varied, the engine speed is so varied that said engine will assume substantially all the varied load over a considerable range of engine speed.

19. In an engine drive system, the combination of an engine, an electric generator driven thereby, and a motor subject to variable load conditions, driven by the generator, the fields of the generator being so designed and proportioned relative to the generator armature that upon variations in the load conditions of the generator the speed of the engine is varied to that amount at which the varied load becomes substantially the full load of the engine at that speed.

20. In an engine drive system, the combination of an engine, an electric generator driven thereby, and a shunt motor, subject to variable load conditions, driven by the generator, the fields of the generator being so designed and proportioned relative to the generator armature that upon variations in the load conditions of the generator the speed of the engine is varied to that amount at which the varied load becomes substantially the full load of the engine at that speed.

21. In an engine drive system, the combination of an internal combustion engine having the characteristics of increasing brake horsepower and decreasing brake torque upon increase of speed, a shunt motor subjected to varying conditions of load, a generator electrically connected with the motor and mechanically connected to the engine, opposing fields on the generator, one of said fields being separately and substantially constantly excited, a field on said generator connected in series with the generator armature and the motor armature, said generator fields being so proportioned that as the motor load increases the generator torque decreases thus causing the engine speed to increase to a substantially predetermined value.

22. The combination of a prime mover, a shunt motor subjected to a variable load, and an electric generator functionally connecting the prime mover and the motor together, means connecting the prime mover and electric generator together, and means on the electric generator responsive to changes in load of the motor member, whereby changes in load on the motor are transmitted to the prime mover and whereby the speed of the prime mover will so vary when the load is varied, that the prime mover will so respond as to assume substantially all of the varied load over a considerable range of engine speed.

23. In a drive system, the combination of an engine, a generator driven thereby and a shunt motor driven by the generator, a compound field for said generator, one component of which field is separately excited, and another component of which field is a function of the motor and generator armature current, said field components being arranged to oppose each other and being so proportioned that an increase in armature current will cause a decrease in generator torque.

HENRY ROSENTHAL.

CERTIFICATE OF CORRECTION.

Patent No. 1,730,786.                    Granted October 8, 1929, to

HENRY ROSENTHAL.

It is hereby certified that error appears in the printed specification of the above numbered patent requiring correction as follows: Page 2, line 82, for the misspelled word "propertly" read "properly", page 5, line 35, claim 9, for "geneartor" read "generator", and lines 43 and 58, claims 10 and 11, respectively, after the word "mover" insert a comma; line 59, claim 11, after the word "means" insert the word "therefor"; and that the said Letters Patent should be read with these corrections therein that the same may conform to the record of the case in the Patent Office.

Signed and sealed this 26th day of November, A. D. 1929.

M. J. Moore,
Acting Commissioner of Patents.

(Seal)